United States Patent
Bucek et al.

[15] 3,678,355
[45] July 18, 1972

[54] CONTROL FOR THREE PHASE A.C. MOTOR

[72] Inventors: Jiri B. Bucek; James R. Shultz, both of York, Pa.

[73] Assignee: Fincor Inc., York, Pa.

[22] Filed: Aug. 11, 1970

[21] Appl. No.: 62,869

[52] U.S. Cl. .................. 318/203 R, 318/207 R, 318/227, 318/230, 318/231
[51] Int. Cl. .................................................. H02p 1/40
[58] Field of Search ............... 318/202, 203, 207, 227, 230, 318/231

[56] References Cited

UNITED STATES PATENTS

| | | | |
|---|---|---|---|
| 3,253,202 | 5/1966 | Cotton | 318/227 |
| 3,564,364 | 2/1971 | Neff | 318/207 R |
| 3,470,428 | 9/1969 | Gill et al. | 318/227 X |

Primary Examiner—Gene Z. Rubinson
Attorney—John R. Bronaugh, Floyd S. Levison, E. Dennis O'Connor and Richard A. Speer

[57] ABSTRACT

A control for a three phase A.C. motor elevator drive in which direction and desired speed signals, as dictated by customer and user demand, are electronically processed to provide intermediate ramp control signals. A summing circuit which utilizes the intermediate ramp control signal and a signal from an elevator motor speed and direction sensing circuit has an output which determines and controls the voltage input, via electronic trigger controls to thyristor controlled power and reversing switching circuits in at least two channels of the three phase A.C. input to a three phase A.C. drive motor. The motor control circuit incorporates a high rate of off-on and phase reversing switching with phase angle control of voltage and current to provide interrelated variable A.C. power supply for both drive and braking of the elevator drive motor in both directions of movement of the elevator cab.

25 Claims, 10 Drawing Figures

INVENTORS
JIRI B. BUCEK
JAMES R. SHULTZ

BY Strauch, Nolan, Neale, Nies & Kurz
ATTORNEYS

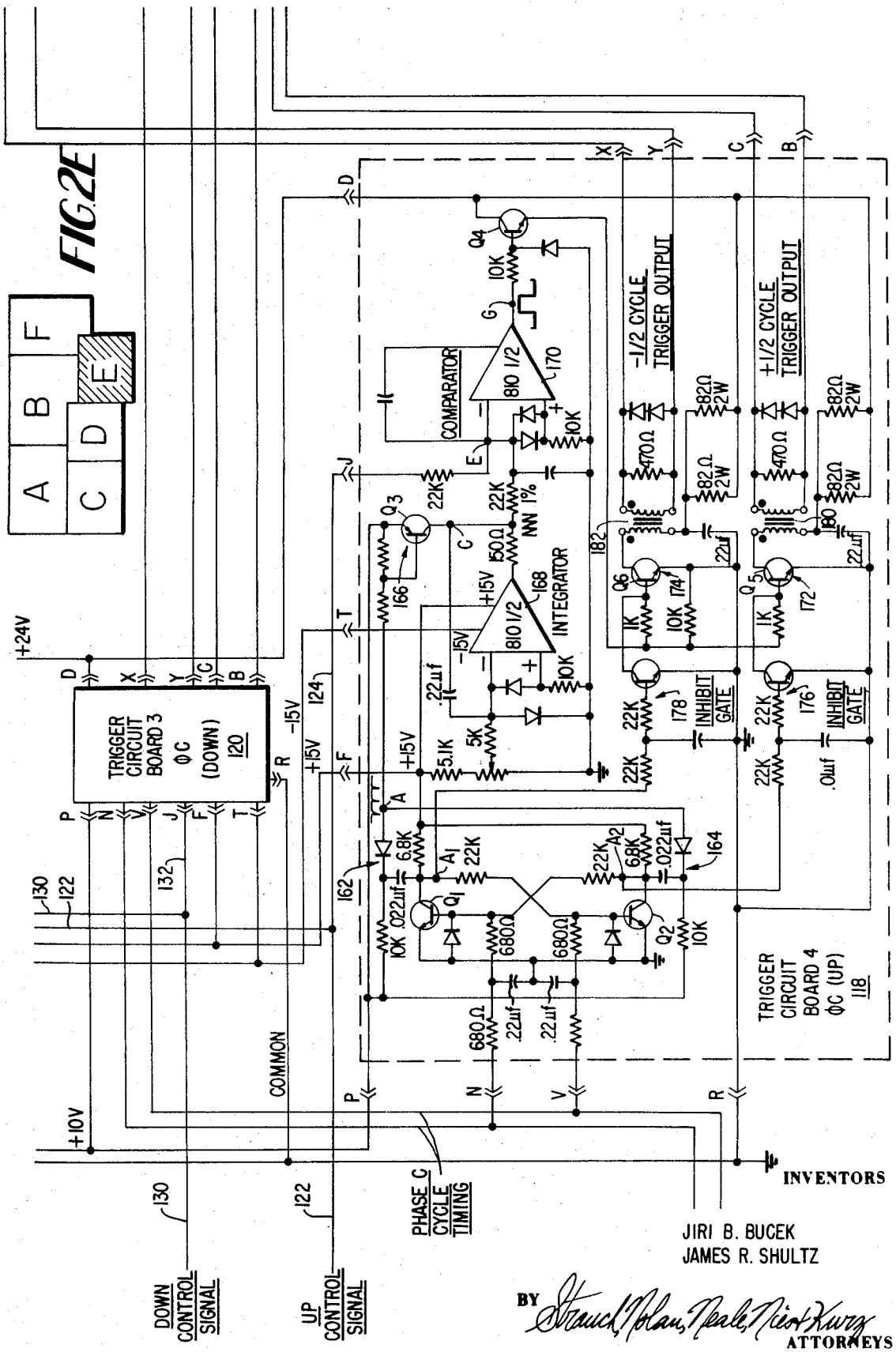

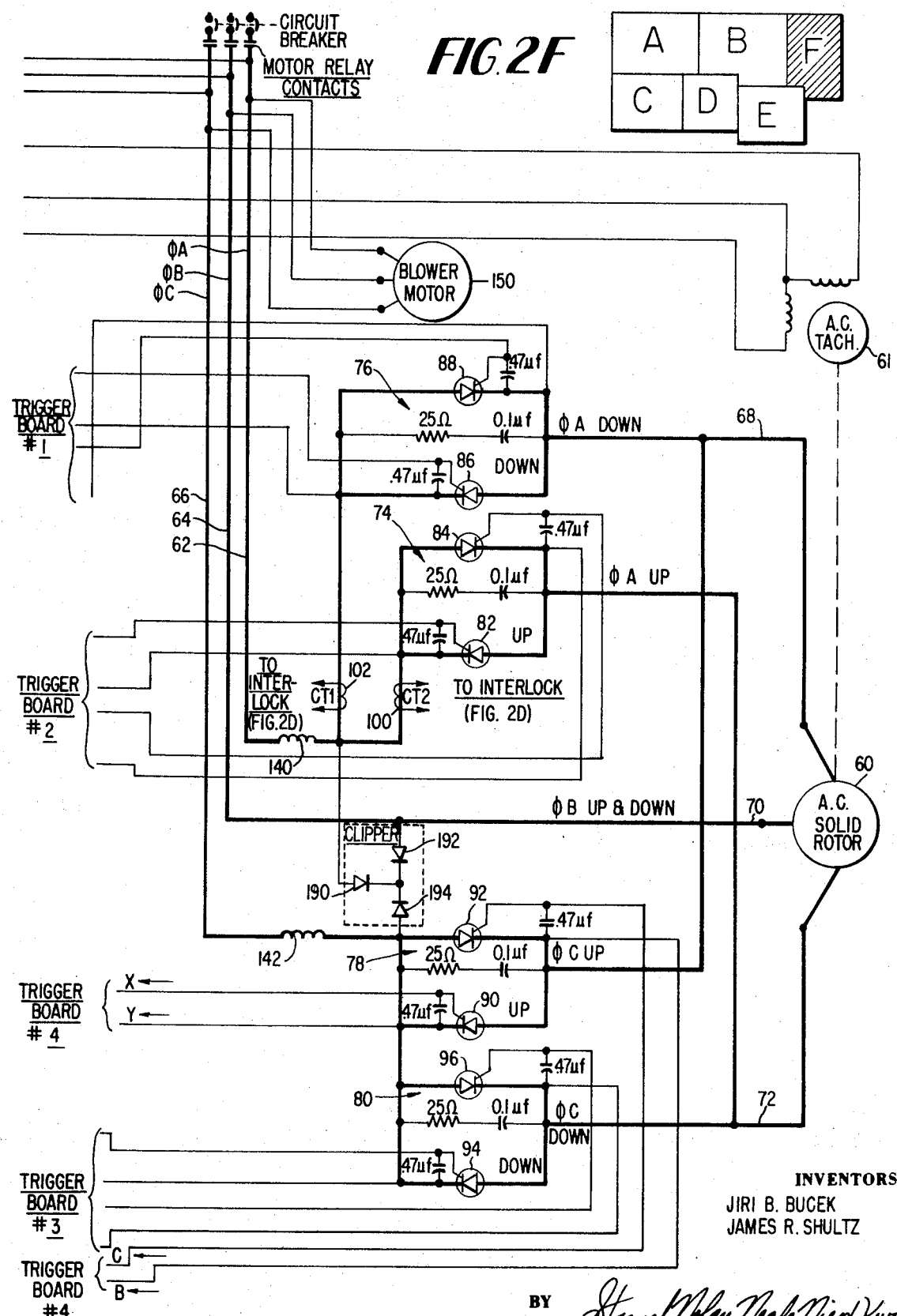

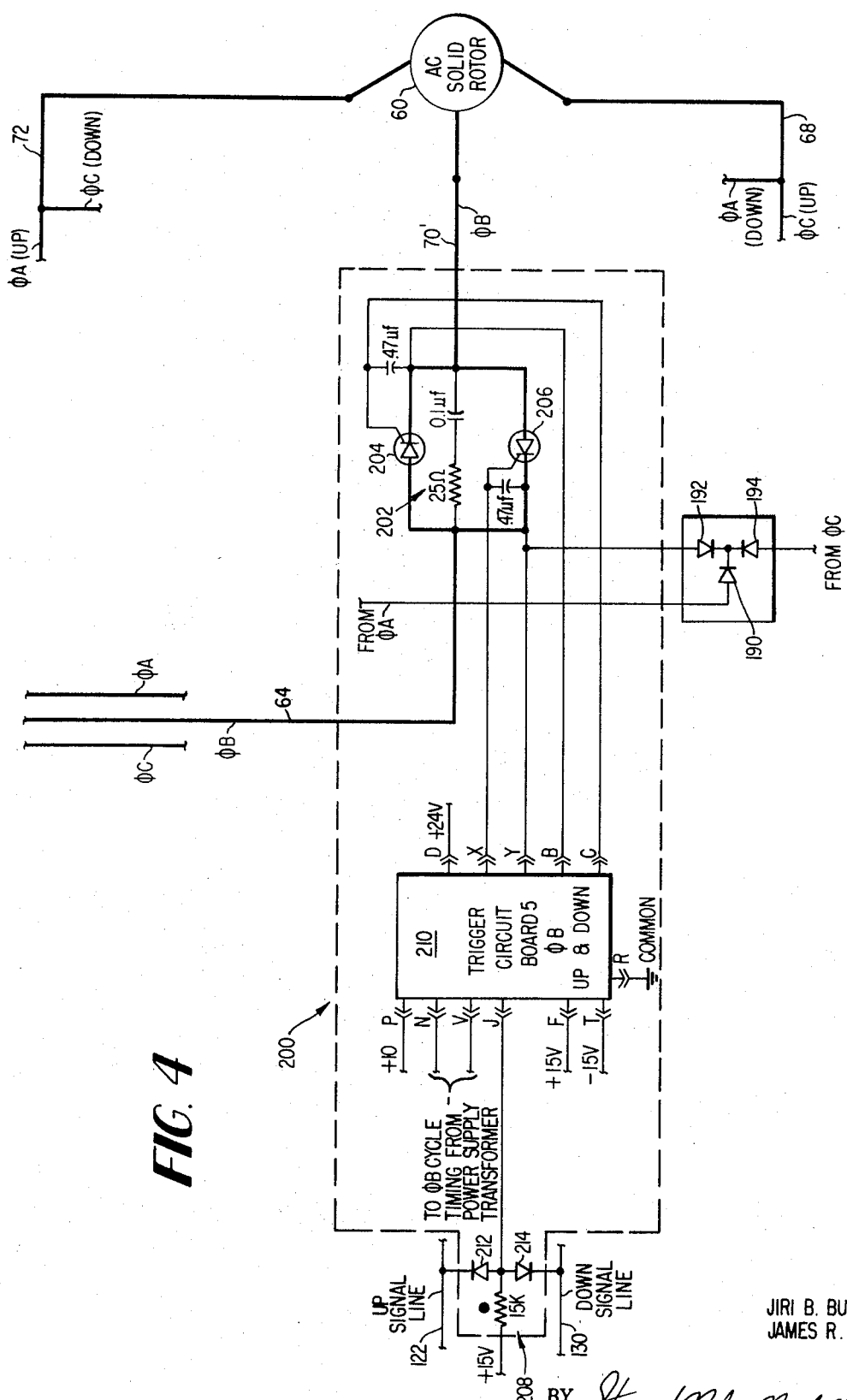

CONTROL FOR THREE PHASE A.C. MOTOR

BACKGROUND OF THE INVENTION

Most high-speed electric elevators which carry people use a D.C. motor to raise and lower the cab according to the supervisory control scheme. Practically all high-speed automatic, as well as nonautomatic, elevators made today convert the available A.C. to D.C. by a specially designed motor-generator set used with a variable voltage (Ward-Leonard) control system. Because of low starting torques, elevator A.C. drive motors have been operated at relatively high speeds, being connected to the hoist sheaves through a gear reduction set. Some of the previously known polyphase A.C. elevator drive motors used two sets of windings, one for high speed and one for low speed, however shifting speeds in such systems result in a noticeable jar to the passengers. More recent developments in A.C. motors, particularly the three phase solid rotor type, have resulted in controls by voltage regulating means enabling operation at variable speeds from stall up to near synchronous speed. One aspect which has enabled this is improved cooling techniques used to dissipate the substantial heat generated while A.C. motors are operated at low speeds as well as during electrical braking. An example of such a motor is shown in U.S. Pat. No. 2,764,704.

Variable speed A.C. motors have been used with controls using variable voltage levels and reversing switching mechanisms responsive to magnetic amplifier triggering devices. A major drawback to use of such systems in personnel carrying elevators is an inherent lag in the mag-amp trigger circuit operations which, while relatively smooth, does result in a noticeable step during each change in speed. While that is tolerated in construction hoists and dumb waits, nevertheless it is objectionable for use in high-speed elevators for people.

The present invention provides an A.C. motor control using solid state technique to acquire a tight, sophisticated control of motor acceleration, deceleration and programmed speed which, to all intents and purposes, eliminates lag in motor response to change speed signals in the control system. The desired result is instantaneous response in motor power or electrical braking.

The control circuit in the present invention provides motor directional and speed reference signals as voltages shaped into a smooth linear ramp summed with a feedback signal which is responsive to motor speed and direction. The amplitude and polarity of the amplified error controls the current flow and reversing of phase rotation, respectively, in at least two of the three phase motor inputs through fast responding, solid state trigger circuits controlling thyristor switches. Motor direction and speed conditions are sensed by a special A.C. tachometer and feedback circuit which feeds into the feed control circuit, as described above. The A.C. tachometer with a direction and speed sensing circuit is the subject matter of and is fully disclosed in a copending application Ser. No. 875,193, filed Nov. 10, 1969.

SUMMARY

Accordingly, a primary object of the present invention resides in providing a novel A.C. motor elevator drive circuit for cooperation with a conventional automatic high-speed elevator supervisory logic system to enable a motor output drive having smooth and substantially instantaneous changes in speed regardless of load as a result of continuous comparison of command and feedback signals. While the novel drive circuit has been specifically developed for use with A.C. motors to drive elevators, it can be readily adapted for use in other applications of A.C. motors with variable speed and reversing requirements.

In conjunction with the foregoing object, the motor utilized is a three phase solid rotor motor, at least two of the input phase lines being connected through thyratron type (thyristor or SCR) switching circuits to control current and to reverse the associated phase input lines for motor speed and direction control. Both positive input power and A.C. braking are selectively utilized through the switching circuits. Each phase channel has independent thyristor circuits for "up" and for "down" signals and each independent thyristor circuit has opposed or inverse parallel thyristors for regulating each half cycle and is controlled via its own solid state trigger circuit. A master control responsive to the condition demanded by elevator logic, e.g., elevator to go up one floor or multi-floors, will control acceleration, maximum speed, deceleration and stop via an infinitely variable smooth output ramp signal modified by motor speed and direction and directed in timed relation with the various phase cycles to the appropriate trigger circuits.

In conjunction with the foregoing object, the elevator logic signals, after appropriate shaping are modified by demand directional logic signals, amplified and integrated with feedback signals from the motor tachometer circuit to provide control signals to "up" or "down" trigger circuits which control the thyristor switching circuits for the motor input phase channels.

Still another object resides in providing a universal solid state trigger circuit which provides positive going output trigger pulses for turning on an independent thyristor for each half cycle of an alternating phase load channel. The trigger circuit includes a bi-stable, multi-vibrator circuit whose "set" and "reset" inputs are controlled by timing pulses derived from each half cycle of the phase input to the controlled phase channel. Speed signals are compared, shaped and via AND gates and amplifier circuits provide cycle chopping trigger output pulses for each one-half cycle to control current flow through thyristor circuits during each half cycle of an input phase.

Safety electronic lock-out circuits are provided to prevent both the "up" and "down" channels from being turned on by trigger circuits at the same time. Current sensing devices in both the "up" and "down" channels of at least one of the switchable phases feed signal information back to the lock-out circuits in the control signal input connections to the trigger circuits. Further safety circuits constitute devices such as line chokes in the three phase motor power input lines to protect the thyristors from line current surges.

These and other objects will appear as the description proceeds in connection with the appended claims and the annexed, below-described drawings.

DESCRIPTION OF DRAWINGS

FIGS. 2A through 2F taken together, as indicated by the small legend assembly block FIG. 2 on the sheet with FIG. 2A, is a schematic diagram showing an elevator drive circuit in accord with the block diagram of FIG. 1. Each sheet includes a small assembly legend showing the position in which that specific sheet fits into the overall FIG. 2.

FIG. 4 is a schematic diagram illustrating how a thyristor switching circuit and a single trigger board can be incorporated into the FIG. 2 circuit for controlling the power supply conduction angle in the third phase of the three phase motor.

DESCRIPTION

Figure 1:
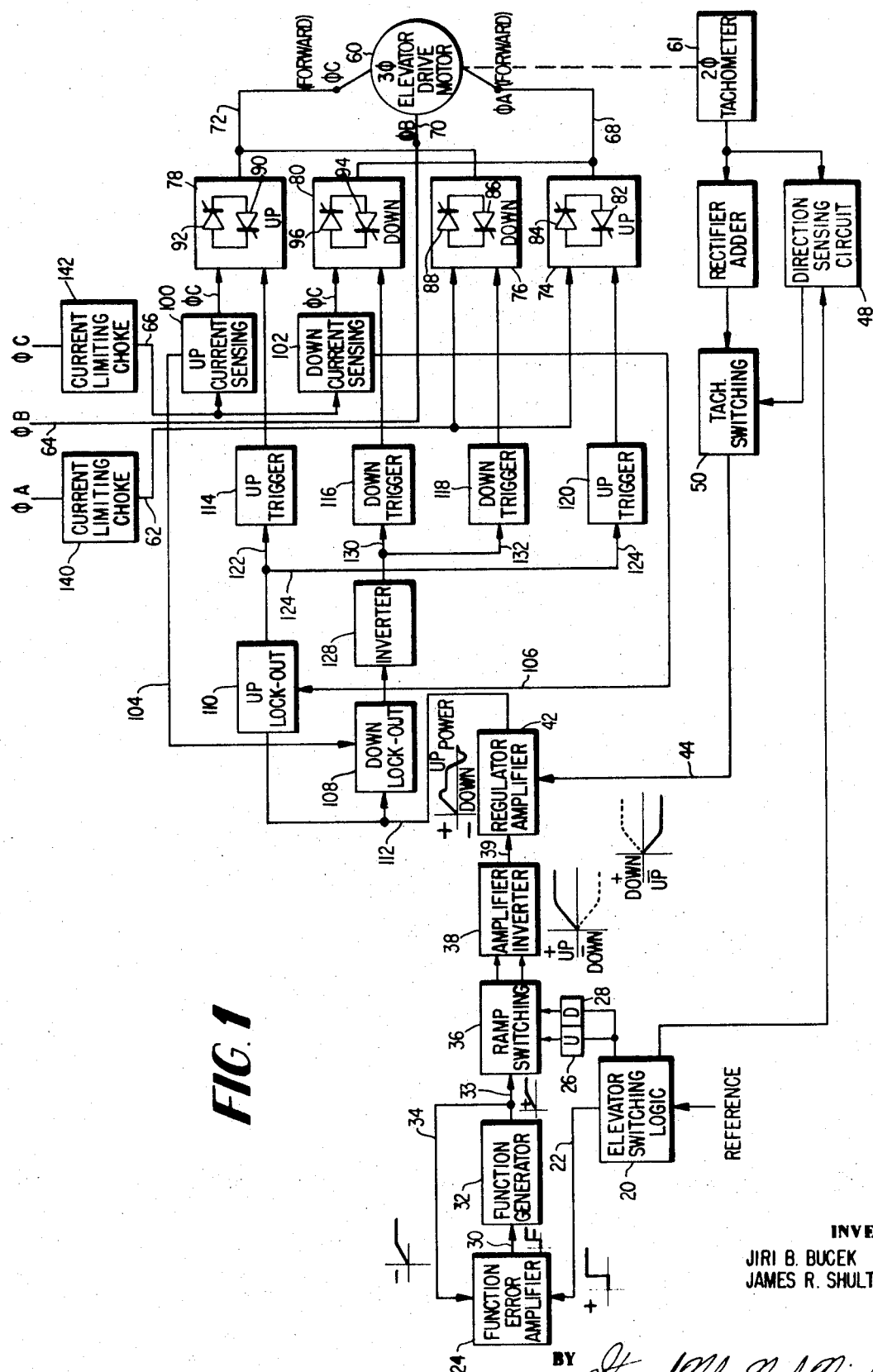
FIG. 1 is a block diagram illustrating a control circuit for a three phase A.C. elevator motor in accord with the present invention.

The present invention is described as incorporated in a control system for use with a three phase A.C. motor elevator drive and eliminates the motor generator set used to convert A.C. power to D.C. power for operating a D.C. elevator drive as is used in most high-speed elevators. It is to be understood that the system can be used to control other three phase A.C. motor applications.

The control system for the A.C. motor drive involves starting, running and stopping the elevator lifting motor in a manner which avoids the discomfort of abrupt transitions in speed. The motor control will be described primarily with reference to the block diagram seen in FIG. 1 although specific references will, at times, be made to the circuitry in the schematic drawing FIG. 2 and the timing chart of FIG. 3.

Elevator supervisory circuits are well known and conventional. Such parts of an elevator system are usually acquired or furnished separate from the motor control circuits, and include the master panels, cab controls which pre-determine which elevators go to which floors; or selectively determine maximum speeds for different run, i.e., single floor and multi-floor runs; provide floor landing level circuits, door control and controlled circuits; and elevator bank interrelating circuits. While some of the output terminal parts of the supervisory controls are shown in this disclosure, most of the elevator system components, not related to the motor control, have not been included.

Although the control system can be applied to the motor control for each elevator in a bank of elevators in a system, for purposes of simplified description, the elevator system to which the motor control is applied and described can be considered to be one with a single car serving two or more landing.

The logic in the elevator supervisory system provides signals to the motor control system which determines whether the motor drive should make the elevator start, stop, go up or down, what its maximim speed will be during the run, and its leveling speed. Accordingly, the control circuit of this invention is responsive to such command signals from the elevator switching logic, and feedback signals representative of the condition of the control system as well as of motor speed and direction are integrated and correlated with such logic signals to provide appropriate control of the motor.

Certain modifications of the various sub-circuits such as amplifiers, integrators, inverters and feedbacks as well as safety circuits will be obvious to the skilled electrician and are intended to be encompassed in this invention. As disclosed, thyristor or silicon controlled rectifier (SCR) switching circuits are used to control the power level input to the elevator motor as well as to reverse the motor input phase leads. Any equivalent solid state thyratron-like device, which may be operated by the application of a suitable signal to a control electrode thereof and which may thereafter be deactivated only by disabling a transconductive path thereof, the control electrode being insensitive once activated by the control signal until the next succeeding disabling of the transconductive path, can be used in place of the thyristors. For example, TRIAC's if made to take the requisite current flow, could replace the inverse parallel connected thyristors used in each phase direction channel of the exemplary disclosure.

SPECIFIC DESCRIPTION

Referring to FIG. 1, an elevator run will be initiated by the supervisory system by depressing a control button (not shown) in the elevator car or at a landing. This actuates the elevator switching logic 20 which produces a predetermined D.C. voltage signal on its output 22, which is connected to and provides an input to the function generator error amplifier 24. The amplitude of the voltage output signal developed by switching logic control 20 will determine the maximum speed to which the car can accelerate during the desired run and the slower levelling speed as the car approaches the selected landing. For multi-floor runs the elevator logic signal will have an amplitude which permits the elevator to accelerate to its highest speed. For single floor runs the control voltage amplitude will be less, permitting acceleration to a fraction of the highest speed. The supervisory control also provides an output signal at other predetermined levels indicative of approach or leveling speeds; also provides a signal indicative of zero speed or stop condition and which applies and releases the elevator floor holding brake; and also provides via, up and down relays 26 and 28, a direction control for elevator drive.

The output on line 30 from the function error amplifier 24 is integrated in a function generator 32 at an adjustable preset rate. As the function generator signal on output 33 integrates upward in amplitude, that output signal on a parallel connection 34 is fed back to the function error amplifier 24 to oppose the input signal at a summing junction. The output signal of the function generator then remains at a level indicative of desired speed until the elevator logic dictates otherwise.

The function generator output signal, designated as the output ramp, is fed on line 33 to the ramp switching circuit 36 which includes relay contacts 26-1 and 28-1 which, depending upon which of the "up" and "down" relays 26 and 28 is energized, provides a control signal to one or the other input of an amplifier/inverter stage 38. Depending on the condition of the "up-down" relay contacts (FIG. 2A) in the ramp switching circuit 36, the inverter output signal will either be a positive ramp or a negative ramp.

Coupled directly to the three phase drive motor shaft is a two phase A.C. tachometer 61 which supplies both motor speed and motor direction information to the system. An output signal proportional to motor speed is obtained by rectifying and combining the two phase tachometer output, as is fully described in the aforedescribed copending application. This signal is positive for one direction of rotation of motor 60 and negative for the other direction of rotation. The polarity reversal is accomplished by the tachometer switching circuit 50. The tachometer feedback signal is fed to a summing junction 40 (FIG. 2A), at the input to the error regulator amplifier 42.

The system can be best described in conjunction with an example. If the elevator is programmed to go up one floor by the elevator switching logic, that condition will produce a positive going ramp of a predetermined amplitude as the output on line 39 from the amplifier/inverter stage 38. This signal is fed to the summing junction 40 (FIG. 2A) at the input of the regulator amplifier 42. As was previously described, also fed to this same summing junction 40 is a D.C. feedback signal on line 44 from the tachometer switching circuit. The polarity of the tachometer feedback signal is determined by the tachometer direction sensing circuit 48 and tachometer switching circuit 50, such that it will buck out the positive ramp on line 39 from invertor 38 when the elevator is programmed to go up. When the elevator is programmed to run the opposite direction, via the supervisory logic relays 26 and 28, FIG. 2A, and associated up or down relay switching contacts 26-1 and 28-1 (FIG. 2A) and 26-2 and 28-2 (FIG. 2B) the polarity of both of these signals is reversed and the tachometer signal will still buck out the ramp from inverter 38.

The difference signal from this summing process, which can be positive or negative, is amplified and inverted through the regulator amplifier 42. In all cases if the output signal from the regulator amplifier 42 is negative it is an effective "up" signal and if positive it is an effective "down" signal to the motor power controlling circuits. It should be noted that an "up" signal from the regulator 42 will not necessarily drive the elevator up, but can be a braking signal during a downward elevator drive. During a normal run the drive motor 60 might be receiving both "up" and "down" signals even though the elevator is moving in one direction. This provides the required control of the system.

A three phase power source (FIG. 2F), through suitable circuit brakers and switches, provides A.C. drive power and, via transformers and rectifier circuits provides power and timing for the control system. The main lines for phases A, B and C, designated 62, 64 and 66, are connected through thyristor control and switching circuits to the three phase input lines 68, 70 and 72 to motor 60. Each of at least two or the main lines, e.g., phases A and C, can be selectively connected to an associated pair of the three input lines to the three phase motor 60, or can be reversely connected to the same pair of input lines to respectively provide drive or braking power in both directions of motor rotation.

Figures 2, 2A:
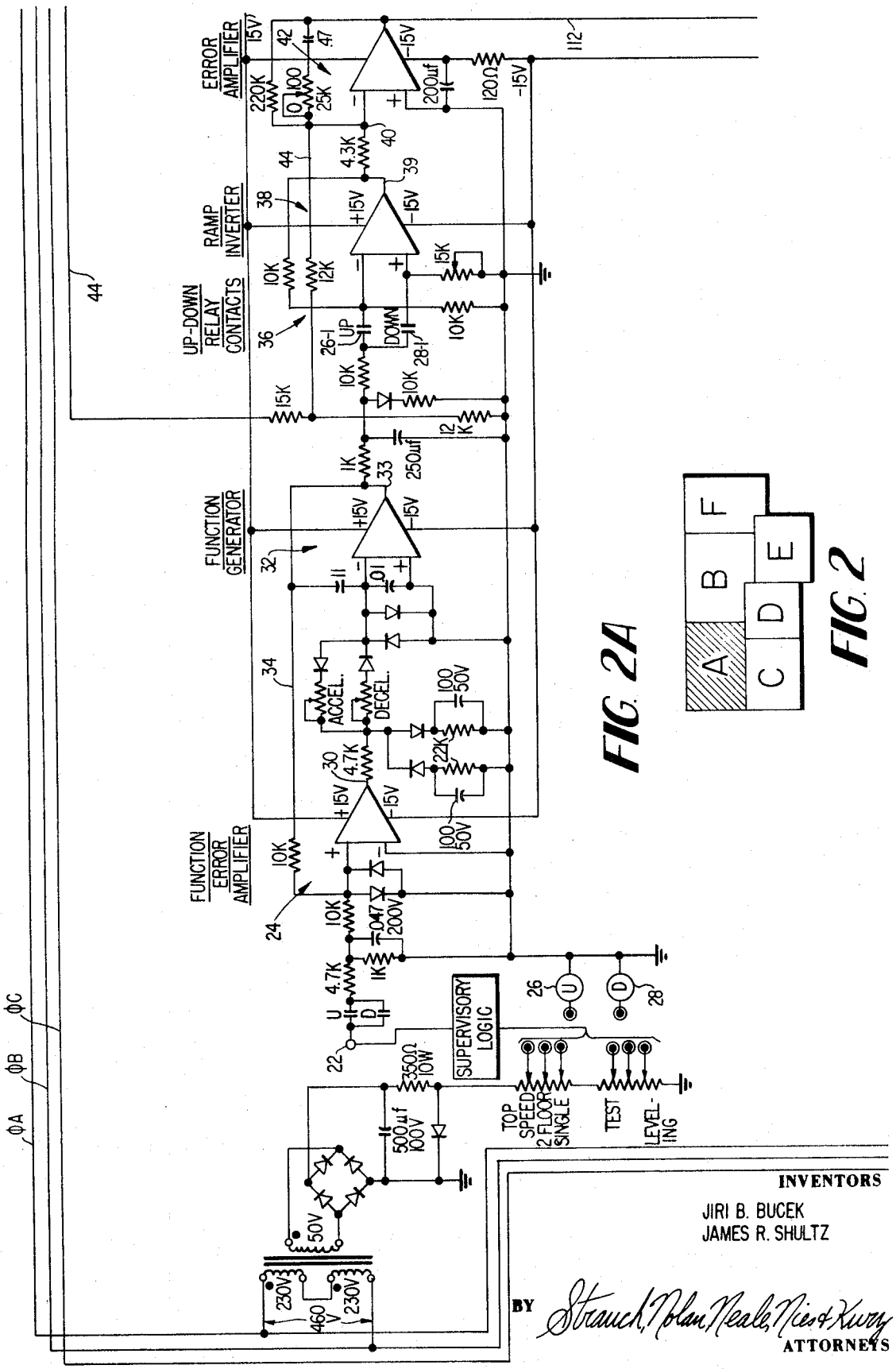
Figure 2B:
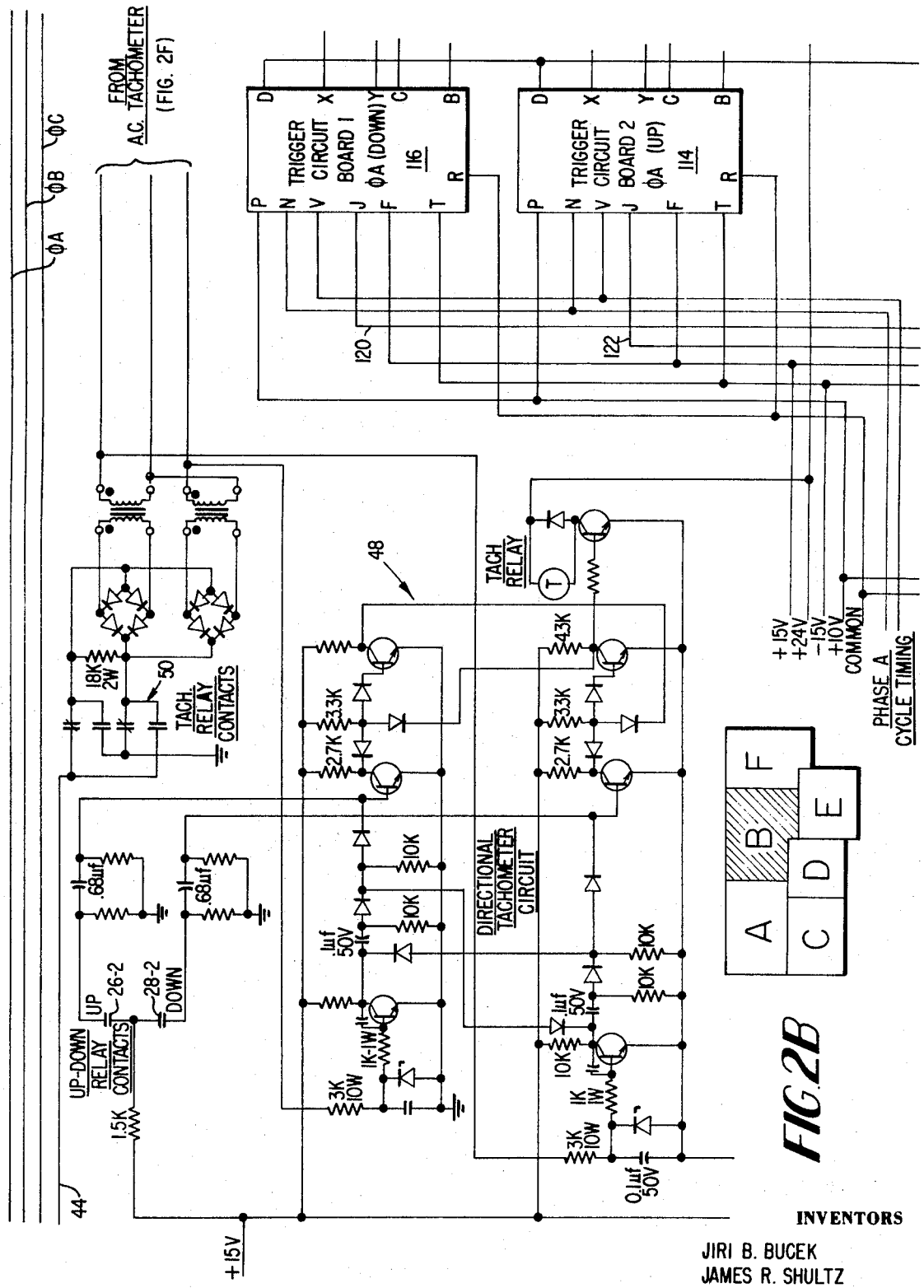
Figure 2C:
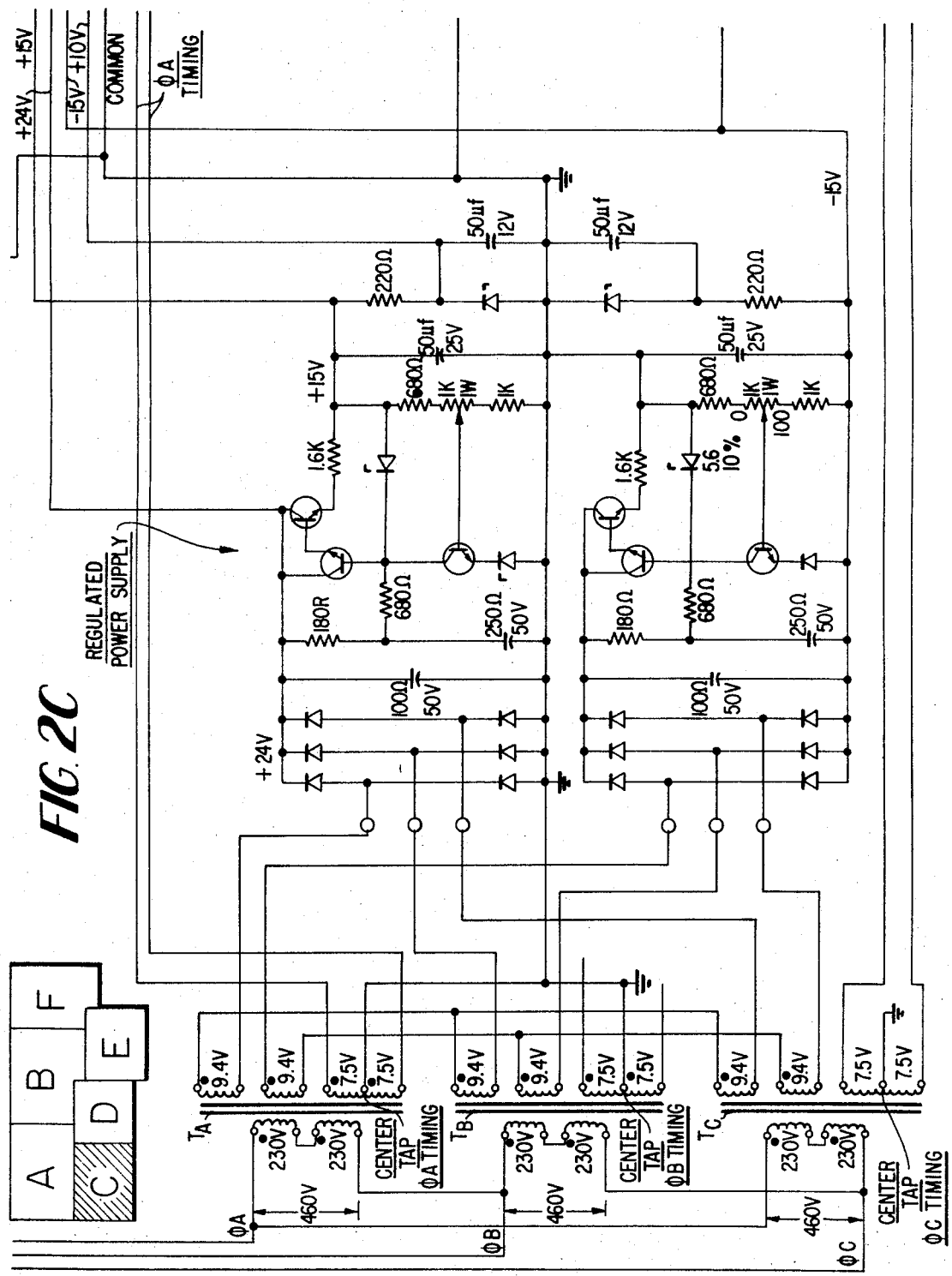

The three phase A.C. input, via the transformer $T_a$, $T_b$ and $T_c$ and full wave rectifier circuits as seen in FIG. 2C, provides a regulated D.C. supply for the control system. Center tapped secondaries in transformer phases A and C provide cycle timing signals used by the thyristor trigger circuits, as will be further described.

Phase A, via power line 62, connects through dual inverse parallel thyristor control circuits 74 and 76 to respective motor input leads 68 and 72 and phase C, via line 66, connects through dual inverse parallel thyristor control circuits 78 and 80 to respective motor input leads 72 and 68. Each dual thyristor control circuit has two thyristors connected in parallel, but in opposed directions to enable controlled current flow in both directions, i.e., during each half cycle, if an appropriately timed trigger pulse is applied to the control electrode of the thyristor for that half cycle of that phase channel.

Circuit 74 includes inverse parallel thyristors 82 and 84 and is designated "up" control for phase A. Circuit 76 includes inverse parallel thyristors 86 and 88 and is designated the "-down" control for phase A. Circuit 72 includes thyristors 90 and 92 in inverse parallel arrangement and is designated the "up" control for phase C. Circuit 80 includes thyristors 94 and 96 in inverse parallel arrangement and is designated the "-down" control for phase C.

Each thyristor has trigger (or control) leads connected to associated trigger circuits, as will be more fully described hereinafter.

It is necessary to prevent both the "up" channel and the "-down" channel in each of the phase A and phase C current supplies to both the A and C phase windings of the motor 60 from being turned on at the same time. If that were to happen, the three phase input line currents would become excessively large, and possible damage the thyristors in the "up" and "-down" phase switching channels. To prevent that from happening, the motor drive or braking current is sensed by current transformers 100 and 102 in the "up" and "down" channel of one of input phases A or C. The sensed "up" or "down" current flow information is fed via a logic circuit 104 or 106, respectively, to associated safety lock-out circuits 108 and 110 which operate to prevent turning on of the "down" channel while the "up" channel is turned on and vice versa.

The amplitude of the output signal from the error (or regulator) amplifier 42, the amplitude of which represents the variation in high or low motor speed relative to the desired speed, is connected, via line 112, through directional diodes $D_1$ and $D_2$ as inputs to one or the other of the lock-out circuits 108 and 110 and thence, as permitted by one of the lock-outs 108 or 110, to "up" trigger circuits 114 and 118 or "down" trigger circuits 116 and 120. A negative or "up" signal on input 112, through diode $D_1$ provides a signal from the "up" lockout circuit 108, via its amplifier 125 on parallel connection lines 122 and 124, to drive the two "up" channel trigger circuits 114 and 120 directly, while a positive or "down" signal from the regulator amplifier 42, through diode $D_2$ to the "down" lockout 110 provides a signal on its output 126 which must be inverted through inverter amplifier 128 and thence, via parallel connection lines 130 and 132, to drive the "down" channel trigger circuits 116 and 118.

Rectified signals from the "up" and "down" channel current transformers 100 (up) and 102 (down) ground any incoming signals to respective lock-out circuits 110 (down) and 108 (up), so the function error signals on line 112 can have no effect on the signal lockout amplifier if current is sensed in the "down" channel and vice versa. Each of the lockout amplifiers 125 and 128 when subjected to a signal output will provide an amplified output signal between fixed positive and negative levels which, in the exemplary control system, is selected as from +10V to −10V. When either circuit 108 or 110 is locked out, or the error signal on line 112 is zero, the respective amplifier of the circuit will transmit a maximum positive level signal, and for a full power error signal on line 112 (either full negative or full positive) the safety interlock output signal from the appropriate one or the other of amplifiers 125 or 128 will be full negative. Adjustable resistors 127 and 129 in the input circuits of respective interlock amplifiers 125 and 128 enable adjustment of their outputs for a zero signal input.

The safety interlock "down" output is parallel connected via lines 130 and 132 to the two trigger circuits 116 and 120 of trigger boards 1 and 3 (FIGS. 2B and 2E) to drive, in appropriate timed relationship to the phase cycles, the "down" thyristors (86 and 88) (94 and 96) in each channel of the respective A and C phase input lines to motor 60, to provide variable "down" power in two legs of the three phase line power connection to the motor. Similarly the safety interlock "up" output is parallel connected via lines 122 and 124 to the two trigger circuits 114 and 118 of trigger boards 2 and 4 (FIG. 2B and 2E) to drive, in appropriate timed relationship to the phase cycles, the "up" thyristors (82 and 84) (90 and 92) in each channel of the respective A and C phase input lines to motor 60 to provide variable "up" power in two legs of the three phase inputs to the motor.

TRIGGER BOARDS

The trigger circuits 114, 116, 118 and 120 of respective trigger boards 1, 2, 3 and 4 are identical and the boards are interchangable. The circuit components are assembled on a printed circuit board with plug-in terminals. For convenience in drawing disclosure, boards 1, 2 and 3 are shown in block form and the trigger board circuit 118, which is the same as the circuit for all trigger boards, is disclosed in detail for trigger board 4 (FIG. 2E). All boards have identical plug-in terminals and similar letter references are shown for comparison purposes on trigger boards 1, 2, 3 and 4. Terminals D, E, F, P, R and T are terminal connections to various voltage levels (as indicated on the drawing) from the power supply. Terminals N and V provide connections to selected phase channels for receiving cycle timing signals corresponding to the A.C. wave forms of the respective phases. Terminal J provides the connection for the input control signal (from the safety interlocks) to the trigger board. Terminals X and Y are isolated output terminals for one-half cycle thyristor triggering, while terminals C and B provide the isolated output circuit for the other half cycle triggering of the opposed thyristor in the associated up or down thyristor switching device for that phase channel.

As will be hereinafter described, trigger board No. 5, in the alternative embodiment (see FIG. 4), which enables provision of thyristor switching control of conduction angle in the third phase ($\phi B$), is identical to the other trigger boards, although the control signal input connection is slightly different.

Figure 3:
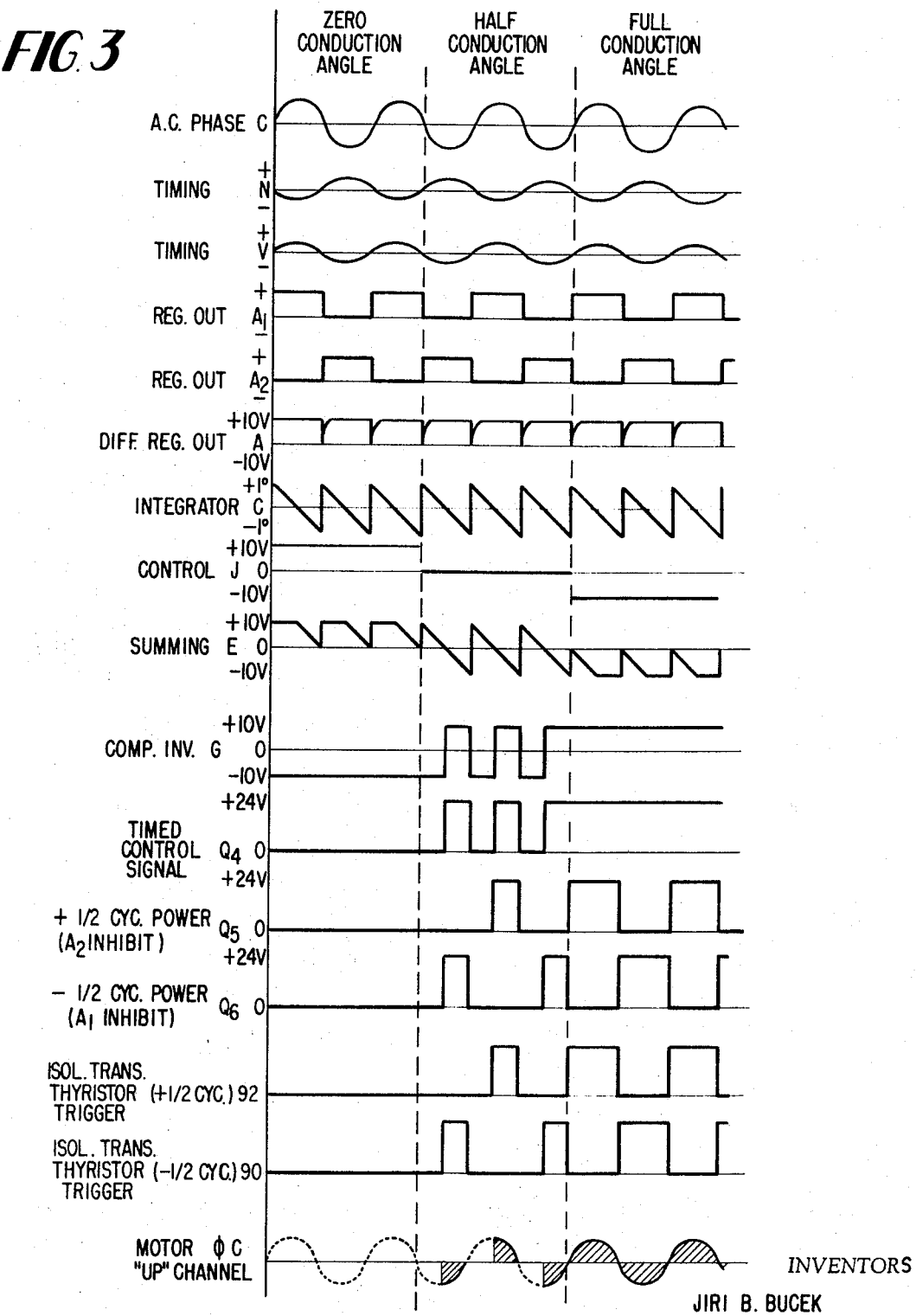
FIG. 3 is an exemplary wave form chart illustrating timed signals at various points in the trigger circuit.

A wave form timing chart for a trigger board is seen in FIG. 3. The voltage wave form at the top represents the sine wave for a specific A.C. phase channel applied to the thyristor switching device and to the primary windings of the power supply transformer ($T_a$, $T_b$ or $T_c$), corresponding to that phase. An associated center tap secondary for that phase transformer provides a pair of independent sine wave signals, 180° out of phase with each other, via connections to respective terminals N and V, the input timing terminals for a register 160 (bi-stable multivibrator) on the trigger board.

Assuming an input signal on terminal N will set the register, an appropriate input signal applied to terminal V will reset the register. Thus, every time a positive half cycle is applied to terminal N, the register will go to a set condition, its transistor Q1 will be turned on and its output junction A1 will go from positive to ground. Each time the cycle signal applied to terminal V goes positive, transistor Q2 is turned on and transistor Q1 is turned off, causing junction A2 to go from positive to ground and junction A1 to go from ground to positive.

Via differentiating capacitor-diode circuits 162 and 164, the negative going transitions appearing at junction A1 and A2 provide a signal wave form at junction A, having negative going timing spikes corresponding to the beginning of each half cycle of the associated A.C. phase. The negative going timing pulses at junction A are used to control an integrator reset circuit 166 which includes transistor Q3. Viewing FIGS.

2E and 3, each time a negative going spike appears at junction A, the integrator reset transistor Q3 is turned on and provides a positive voltage level (+10V) at junction C which resets the threshold voltage of integrator 168 at that positive level. The integrator integrates from +10 to −10 volts during the time period for a half cycle. The amplified speed error control signal, from the "up" interlock circuit 108, which is transmitted on line 124 to terminal J, modifies the integrated saw tooth voltage output from integrator 168 at a summing junction E.

If the control signal applied to terminal J indicates a no power condition, a fully amplified positive signal (e.g., +10V in this specific case) from the safety interlock "up" circuit 108, that voltage level applied to summing junction E will keep integrated (saw tooth) voltage levels above ground level during the entire integrating period. Junction E is connected to the inverting input of an operational (high gain) amplifier 170 whose output has a range from negative (−10V) to positive (+10V). As long as the voltage signal at junction E is positive, the output of the comparator inverter 170 at junction G is at negative saturation, i.e., −10V. Whenever the signal level at junction E goes below zero to negative, the output of the comparator 170, junction G, goes full positive (+10V).

The wave form at the comparator output (junction G)S G) is a square wave, the widths of the positive periods of which represent the desired conduction angle with the time correlated A.C. half cycles in the associated phase channel.

When the signal on input terminal J represents full power, (right hand portion of FIG. 3), in other words, it is at its −10V level, the effective integrated saw tooth wave form applied to comparator inverter 170 is negative during the entire integrating time period, causing the comparator 170 to provide a fixed positive level output for the entire half cycle time period.

Any intermediate signal level applied to terminal J of the trigger board will modify the saw tooth wave form at the summing junction E to form somewhere between the full off and full on conditions shown in FIG. 3. The middle portion of the FIG. 3 chart shows an example of such an intermediate condition, a half conducting angle condition, wherein the 0 volt control signal at terminal J causes a wave form at junction E which is negative during the last half of each half cycle. That negative input to the comparator 170 provides positive square waves on its output to junction G during the last half of each cycle period.

The square wave signals from the trigger circuit comparator 170 are applied through amplifier transistor Q4 and the resulting positive level signals on the emitter of Q4 are used to provide appropriately timed trigger signals to both of the inverse parallel thyristors in an associated thyristor switching device, e.g., device 76. The emitter of Q4 is connected to drive respective power amplifiers 172 (transistor Q5) and 174 (transistor Q6) via a parallel input circuit. Transistor Q5 is inhibited by an inhibit gate 176 whenever the junction A₂ is positive (during a negative half cycle of the associated A.C. phase) and transistor Q6 is inhibited by an inhibit gate 178 whenever the junction A₁ is positive (during a positive half cycle of the associated A.C. phase). Power transistor Q5 can only be turned on during one (positive) half cycle of the associated A.C. phase and is only turned on during the related period when the output transistor Q4 is on. Similarly, power transistor Q6 can only be turned on during the other (negative) half cycle of the associated A.C. phase and is only turned on during the related period when the output transistor Q4 is turned on.

As shown in FIG.3, the outputs of power amplifiers 172 and 174 are square waves, the positive voltage levels of which occur for desired, controlled periods during associated half cycles and always terminate at the end of a half cycle. As shown in FIG. 2E, the collector-emitter circuits of each power amplifier transistor Q5 and Q6 is series connected with the primary winding of an associated isolation square wave transformer. Q5 operates transformer 180 and Q6 operates transformer 182. The two leads of the secondary winding of transformer 180 connect through plug board terminals C and B to the trigger circuit of the half cycle (in the example, the positive half cycle) switching thyristor 92 and the two leads of the secondary winding of transformer 182 connect through plug board terminals X and Y to the trigger circuit of the other of the half cycle (e.g., the negative half cycle) switching thyristor 90.

The isolation transformers 180 and 182 are square wave transformers and thus provide square wave trigger signals to turn on the associated thyristors 92 and 90 substantially instantaneously with the positive going transition of the isolation transformer output to its full positive voltage level, providing accurate control over desired conduction angle of the associated phase half cycle.

The foregoing trigger circuit description was made in connection with the "up" channel of phase C and shows how each half cycle of the A.C. phase wave in that channel will be controlled through its associated thyristor to provide a conduction angle determined by the output signal from the trigger board comparator 170, as driven by the control signal on the "up" interlock output lines 122 and 124. The same control signal is used to drive the phase A "up" trigger board circuit 114 which, in accord with phase A cycle timing signals, will trigger the inversed parallel thyristors 82 and 84 of the phase A "up" channel thyristor switching device 74, at appropriate desired periods, within the positive and negative half cycles.

If the interlock output control signal calls for "down" power the two "down" trigger board circuits 116 and 120 will trigger their associated thyristor devices in accord with associated phase cycle timing signals.

The three diodes 190, 192 and 194 seen in FIG. 2F, having their anodes respectively connected to one of the input phases A, B and C and their cathode leads joined, constitute a clipper for attenuating over-voltage spikes.

Current limiting line chokes 140 and 142 are provided to protect the phase switching thyristors from excessive current surges.

The motor 60 can utilize an automatic cooling blower 150 or fan (FIG. 2F) connected into the control circuit with desired automatic and safety features.

ALTERNATIVE EMBODIMENT THIRD PHASE CONDUCTION ANGLE CONTROL

To provide more efficient power utilization by the three phase motor 60, an additional circuit (see FIG. 4) can be incorporated in the circuit shown in FIG. 2, to provide thyristor switching of third phase input to the motor, phase B in the exemplary disclosure. In FIG. 4, the added circuitry 200 is encircled in a dotted line box and only as much of the circuit of FIG. 2 which is needed to show the manner in which the third phase control is connected, is shown outside of the dotted lines. The phase B input line is referenced as 70' while other components common to FIG. 2, retain the same reference characters.

The additional circuit 200 requires: (1) one trigger board, identified as trigger board No. 5; (2) one thyristor switching device 202, including a pair of thyristors 204 and 206 connected in inverse parallel relation between the phase B power input line 64 and the phase B motor lead 70'; and (3) a blocking diode circuit 208 to provide a common control signal connection from both the "up" and "down" safety interlock circuits 108 and 110 (FIG. 2D) to the No. 5 trigger board control terminal J.

Because, when the three phase power input to the motor 60 is reversed, the third power input line remains connected to the same motor input connection while the other two power line phase connections to the motor inputs are switched, one thyristor switching device 202 in the third phase channel can control conduction angle within that third phase during forward or reverse power input. Within the dual, inverse parallel thyristor device 202, the thyristor 204 controls phase B conduction angle for the positive half cycle and thyristor 206 controls phase B conduction angle for the negative half cycle.

Still referring to FIG. 4, the trigger circuit 210 of trigger board No. 5 is identical to that in the other trigger boards, as hereinbefore described for trigger board No. 4 (see FIG. 2E). Its terminals D, F, P, R and T connect to the same voltage levels in the regulated power supply as do the same terminals of the other trigger boards. Terminals B and C provide trigger control of the positive half cycle thyristor 204 and terminals X and Y provide trigger control of the negative half cycle thyristor 206. Phase B cycle timing is derived on terminals N and V connected to the center tap secondary on the phase B power supply transformer $T_b$ shown in FIG. 2C.

Figure 2D:
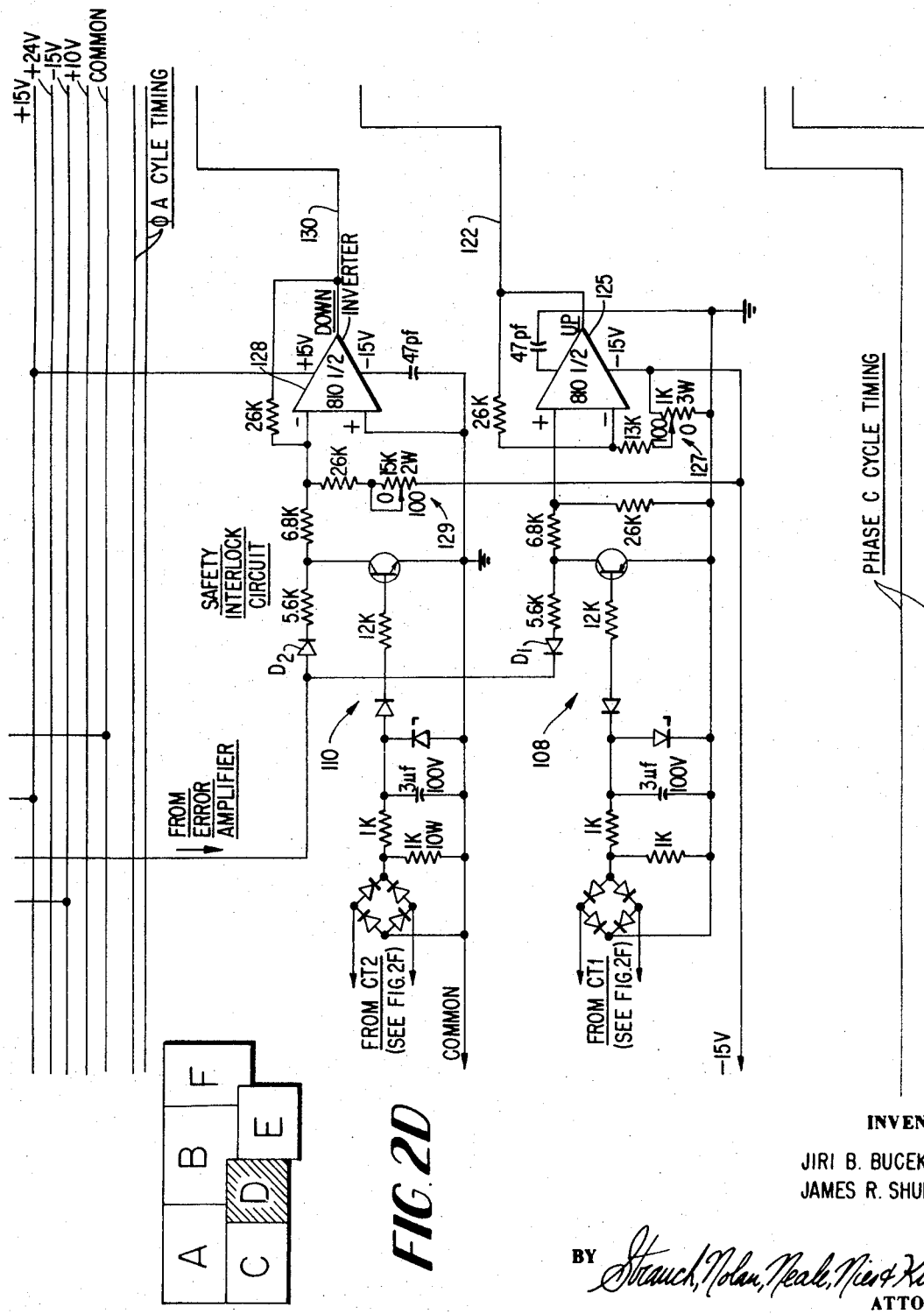

As has been hereinbefore described, the system control signal which indicates the required power input to motor 60 can be calling for "up" or "down" power input regardless of the direction of rotation of the motor (I.E., whether the elevator is going up or down). The "up" signal and the "down" signal are applied on two control signal lines 122 and 130 respectively from the safety interlock circuits 108 and 110 (FIG. 2D). Because the single phase B trigger circuit 210 is used for both "up" and "down" thyristor control in that phase, its input terminal J must be connected to receive control signals from both the "up" and "down" control signal lines 122 and 130. That parallel connection is accomplished by the blocking diode circuit 208 consisting of a diode 212 with its cathode connected to "up" signal line 122 and a diode 214 with its cathode connected to "down" signal line 130. The anodes of both diodes are connected to terminal J of trigger board No. 5 which is also connected, through a dropping resistance 216, to a positive 15 volt power supply.

With the aforedescribed third phase thyristor switching control, any regulator (or error) signal from the control system amplifier 42 calling for a desired motor speed will control thyristor firing in all three phase channels for a desired conduction angle. This provides better control and avoids undue heat losses which occur when the third phase conduction angle is uncontrolled.

The various values of voltage, resistance and capacitance in the described embodiment are exemplary of an operative circuit and can be changed in known manner by persons skilled in electronic circuitry and remain within the inventive concept.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A motor control system for three phase A.C. motors, having three phase input leads, comprising: means for connecting three phase power lines to the three motor input leads including solid state thyratron type switching circuits in at least two of the connections from power phase lines to two of the motor input leads enabling forward and reverse power input to the motor, each of the forward and reverse circuits phase channels to the motor input leads including solid state thyratron type switching means, with trigger leads, enabling controlled current flow for each half cycle of the respective phase; a solid state trigger circuit for, and having triggering output circuits connected to, each switching means in each forward and reverse channel to said motor inputs responsive to timed cycle pulses of the associated power line phase and to control signals representing motor speed errors relative to a speed reference signal; tachometer means driven by said motor including a tachometer circuit providing outputs indicative of motor rotational direction and speed; and a control circuit for all of said trigger circuits having electrical inputs from a motor supervisory logic circuit providing input reference signals representative of desired speed which is inputted to a function generating means, the output of which is the desired running speed reference signal, said running speed reference signal being inputted with said tachometer output signal to a summing and amplifying means, the output of which is the amplified signal of the sum of said running speed reference signal and said tachometer output signal, said output of said summing and amplifying means providing control signals to said trigger circuits, the amplitude level of which from a neutral level is indicative of required phase conduction angle for forward and reverse power to maintain referenced motor speed, to provide trigger circuit half cycle timing and, for desired forward and reverse phase channels, to operate said trigger circuits to enable motor drive or electrical braking with requisite conduction angle of current in each half cycle of at least said two phases during each direction of motor rotation.

2. A motor output control system as claimed in claim 1, wherein each trigger circuit includes a bi-stable multivibrator with set and reset inputs and an output from each stage; timing means, including inductive coupling with the power line phase associated with the specific trigger circuit, providing sequential signals representing positive and negative half waves of the phase alternately on said multivibrator inputs to oscillate said multivibrator at a frequency corresponding to the associated phase frequency; said multivibrator outputs being coupled to provide a voltage transition signal at the start of each half cycle; means responsive to said multivibrator output to provide a saw tooth wave form with periods corresponding to half cycle periods; means comparing said conduction angle indicative control signals with said saw tooth wave form and providing corresponding square wave trigger output signals, with periods equal to desired half cycle conduction angles, to control the solid state switching device for the associated phase.

3. A motor control system as claimed in claim 2, wherein said voltage transition signals from said multivibrator outputs control a reset circuit for the saw tooth wave generator and said reset circuit includes a transistor having its collector connected to apply a preset voltage level to the reset terminal of the saw tooth generator and said voltage transition signals, via the multivibrator output, are applied to the base of said transistor to control application of said preset voltage level.

4. A motor control system as claimed in claim 3, wherein said saw tooth generator is an integrator, said transistor is PNP, said voltage transition signals are negative going and said connection from said transistor collector terminal is to the integrator inverting input enabling an integrator output with negative going integrating saw tooth wave forms.

5. A motor control system as defined in claim 2, wherein said triggering output circuits include two branch circuits, one for each half cycle; said conduction angle trigger output signals are applied to both of said branch circuits; each said branch includes inhibit gates having inhibit inputs connected to respective different ones of said multivibrator outputs to inhibit transmission of said triggering signal, alternatively, on said branch circuits so that transmission occurs through a branch circuit only when its related half cycle of the associated phase is occurring in the motor phase channel.

6. A motor control system as claimed in claim 1 wherein each of said solid state trigger devices is responsive to half cycle timing signals from the associated power phase and to said control signals indicative of required conduction angle to provide square wave trigger signals on said associated triggering output circuits for switching on and controlling current flow through the associated solid state thyratron type switching device during the desired conduction angle for each half cycle of the current in that associated phase.

7. A motor control system as claimed in claim 6, wherein each solid state trigger device provides conduction angle trigger signals on one or the other of two triggering output circuits while inhibiting output on the remaining one or the other of said triggering output circuits.

8. A motor control system as claimed in claim 6, wherein each of said triggering output circuits includes an isolation transformer between said trigger circuit and said solid state thyratron type switching device.

9. A motor control system as claimed in claim 8, wherein said isolation transformers are square wave transformers.

10. A motor control system as claimed in claim 1, wherein each said solid state thyratron type switching device includes at least two inverse parallel connected thyristors, each thyristor having its control circuit independent of the control circuit for the other thyristor.

11. A motor control system as defined in claim 1, wherein said motor is an elevator drive motor; and the supervisory logic is the elevator supervisory logic, said logic providing input signals which represent desired up and down movement of the elevator and other motor speed reference input signals of various voltage levels indicative of desired elevator speed in either direction.

12. A motor control system as defined in claim 1, wherein said control circuit output control signal is a variable voltage signal with positive and negative limits, the amplitude representing speed and the two polarities representing over or under speed conditions.

13. A motor control system as defined in claim 12, wherein selectively operable means provide circuit connections to all said trigger circuits from said control circuit output control signal to selectively provide connection angle control of all said solid state thyratron type switching devices.

14. A motor control system as defined in claim 13, wherein said circuit connections include two parallel safety interlock circuits, one for controlling said trigger circuits for "up" power channel switching devices to the motor and the other for controlling "down" power channel switching devices to the motor each said "up" and "down" power safety interlocks circuits having an inhibit circuit including means responsive to current flow in a respective "down" and "up" motor input phase channel.

15. A motor control system as defined in claim 14, wherein each interlock circuit controls an output control signal amplifier and its associated inhibit circuit includes: a current transformer, one associated with an "up" and the other associated with the "down" channel connection between a power phase line and associated reversing inputs to the motor; a rectifier circuit connected to the outputs of said current transformer; and a transistor switching device with its terminals connected to the rectifier output and between the signal input terminals to said amplifier whereby induced current in said current transformer will control said transistor switching device to render a control signal input to said associated amplifier ineffective.

16. A motor control system as defined in claim 15, wherein one of said interlock amplifiers is an inverter and directional diodes in the output control signal circuit to said interlock circuits direct positive signals to the amplifier input of one of said interlock circuits and negative signals to the amplifier input of the other of said interlock circuits; whereby the output signals of both interlock circuits have similar voltage level ranges, the total amplitudes of which represent desired half cycle conduction angles in the controlled phase input channels to the motor.

17. A motor control system as claimed in claim 1, wherein said control circuit includes a function error amplifier whose input receives a selected voltage level as a reference speed signal; a function generator amplifier with an inverting input connected to the output of the function error generator and a bypass feedback connection to its input and to the function error amplifier input to provide a ramp output integrated to a selected amplitude level; connections from the function generator output through up-down relay contacts to one or the other of normal or inverting inputs to a ramp signal inverter, the output of which is connected to a summing junction; a circuit from said tachometer output connection to apply to said summing junction, a signal indicative of actual motor speed directly related to the amplitude of said ramp inverter signal but opposite in polarity; the output of said summing junction being applied to an amplifier whose amplified output is said output control signal and whose amplitude is representative of the error in speed between the reference speed and actual motor speed and whose polarity represents over or under speed of the motor relative to said reference speed.

18. A motor control system as claimed in claim 1 wherein a solid state thyratron type switching circuit is incorporated in each of the three connections between the three phase power leads and the three phase motor input leads; two of said switching circuits having a pair of said solid state thyratron type switching means to enable switching of said two phase leads to reverse the power input direction to the motor; the third of said switching circuits having one of said solid state thyratron type switching means to control conduction angle current flow during each half cycle in the third phase input connection during both directions of power input to the motor.

19. A motor control system as claimed in claim 18, wherein a separate trigger circuit is provided for said third phase switching means and said separate trigger circuit receives said output control signals indicative of desired half cycle conduction angle during both "up" and "down" power input conditions.

20. A motor control system as claimed in claim 1, wherein said motor is a solid rotor three phase A.C. motor.

21. A motor control system for three phase A.C. motors, having three phase input leads, comprising: means for connecting three phase power lines to the three motor leads including switching circuits in at least two of the connections from power phase lines to two of the motor input leads enabling forward and reverse power to the motor, each of the forward and reverse circuit phase channels to the motor input leads including thyratron type switching means, with trigger leads, enabling controlled current flow for each half cycle of the respective phase; a trigger circuit for each switching means responsive to control signals representing motor speed errors relative to a speed reference signal; a control circuit for all of said trigger circuits to provide said control signals to said trigger circuits, the amplitude level of which from a neutral level is indicative of required phase conduction angle for forward and reverse power to maintain referenced motor speed, to provide trigger circuit half cycle timing and, for desired forward and reverse phase channels, to operate said trigger circuits to enable motor drive or electrical braking with requisitive conduction angle of current in each half cycle of at least said two phases during each direction of motor rotation; and selectively operable automatic safety interlock means providing a connection between said control circuit and said trigger circuits to prevent switching control in one three phase power direction during switching control in the other three phase power directions.

22. A motor control system as claimed in claim 21, wherein said circuit connections include two parallel safety interlock circuits, one for controlling said trigger circuits for "up" power channel switching devices to the motor and the other for controlling "down" power channel switching devices to the motor, each said "up" and "down" power safety interlock circuits having an inhibit circuit including means responsive to current flow in a respective "down" and "up" motor input phase channel.

23. A motor control system as defined in claim 22, wherein each interlock circuit controls an output control signal amplifier and its associated inhibit circuit includes: a current transformer, one associated with an "up" and the other associated with the "down" channel between a power phase line and associated reversing inputs to the motor; a rectifier circuit connected to the outputs of said current transformer; and a transistor switching device with its terminals connected to the rectifier output and between the signal terminals to said amplifier whereby induced current in said current transformer will control said transistor switching device to render a control signal input to said associated amplifier ineffective.

24. A motor control system as defined in claim 22, wherein one of said interlock means is an inverter and directional diodes in the output signal circuit to said interlock circuits direct positive signals to the amplifier input of one of said interlock circuits and negative signals to the amplifier input of the other of said interlock circuits; whereby the output signals of both interlock circuits have similar voltage level ranges, the amplitudes of which represent desired half cycle conduction angles in the controlled phase input channels to the motor.

25. In combination in a motor control system for three phase A.C. motors, having three phase input leads, switching circuits in at least two power lines to two of the motor input leads enabling forward and reverse power input to the motor, each of the forward and reverse circuit phase channels to the motor input leads including thyratron type switching means enabling controlled current flow for each half cycle of the respective phase and trigger circuits for each switching means responsive to control signals representing motor speed errors relative to a speed reference signal; the improvement comprising a control circuit for all of said trigger circuits, said control circuit comprising: a function error amplifier whose input receives a selected voltage level as a reference speed signal; a function generator amplifier with an inverting input connected to the output of the function error generator and a bypass feedback connection to its input to the function error amplifier input to provide a ramp output integrated to a selected amplitude level; connections from the function generator output through up-down relay contacts to one or the other of normal or inverting inputs to a ramp signal inverter, the output of which is connected to a summing junction; a circuit from a motor tachometer output connection to apply to said summing junction, a signal indicative of actual motor speed directly related to the amplitude of said ramp inverter signal but opposite in polarity; the output of said summing junction being applied to an amplifier whose amplified output is said output control signal and whose amplitude is representative of the error in speed between the reference speed and actual motor speed and whose polarity represents over or under speed of the motor relative to said reference speed.

* * * * *